No. 668,889.  
G. S. TIFFANY.  
TELAUTOGRAPH.  
(Application filed Oct. 19, 1900.)  
Patented Feb. 26, 1901.

(No Model.)

4 Sheets—Sheet 1.

Attest:  
Geo. H. Botts,

Inventor:  
George S. Tiffany

Att'ys

No. 668,889. Patented Feb. 26, 1901.
G. S. TIFFANY.
TELAUTOGRAPH.
(Application filed Oct. 19, 1900.)
(No Model.) 4 Sheets—Sheet 2.

No. 668,889. Patented Feb. 26, 1901.
G. S. TIFFANY.
TELAUTOGRAPH.
(Application filed Oct. 19, 1900.)
(No Model.) 4 Sheets—Sheet 3.
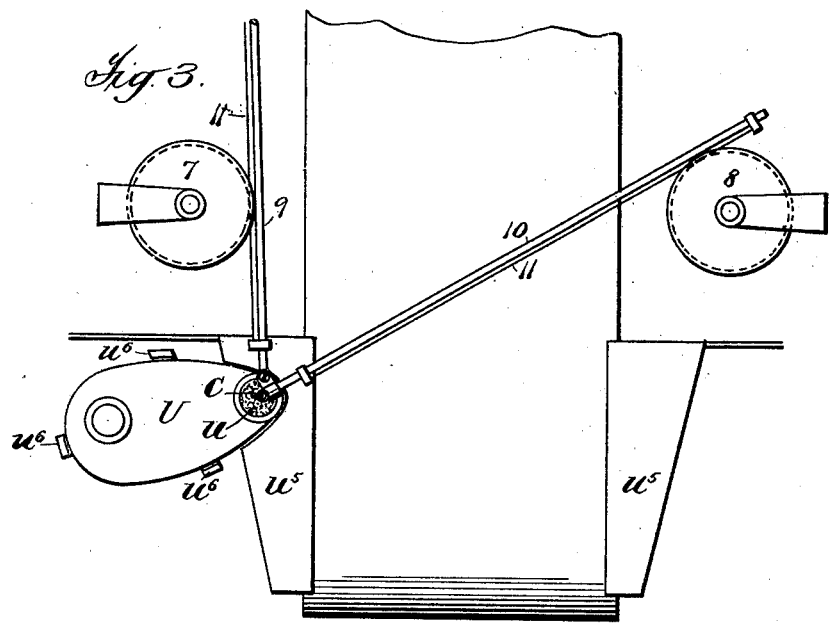
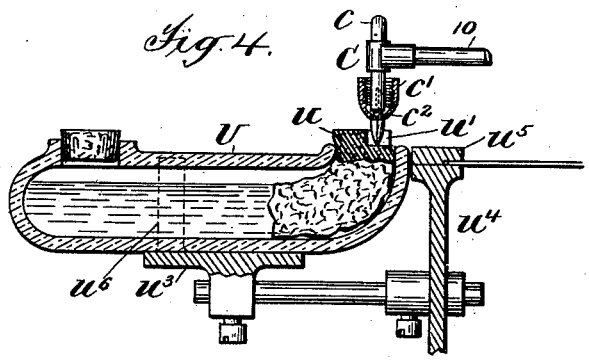
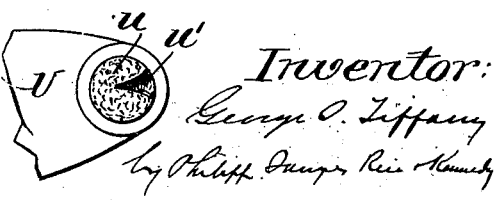

No. 668,889. Patented Feb. 26, 1901.
G. S. TIFFANY.
TELAUTOGRAPH.
(Application filed Oct. 19, 1900.)
(No Model.) 4 Sheets—Sheet 4.

UNITED STATES PATENT OFFICE.

GEORGE S. TIFFANY, OF EVANSTON, ILLINOIS, ASSIGNOR TO THE GRAY NATIONAL TELAUTOGRAPH COMPANY, OF NEW YORK, N. Y.

TELAUTOGRAPH.

SPECIFICATION forming part of Letters Patent No. 668,889, dated February 26, 1901.

Application filed October 19, 1900. Serial No. 33,589. (No model.)

*To all whom it may concern:*

Be it known that I, GEORGE S. TIFFANY, a citizen of the United States, residing at Evanston, county of Cook, and State of Illinois, have invented certain new and useful Improvements in Telautographs, fully described and represented in the following specification and the accompanying drawings, forming a part of the same.

This invention relates to improvements in telautographic apparatus.

One feature of the present invention relates to means controlled by the transmitting-tracer for effecting the movement of the receiving-pen into and out of contact with the paper.

Another feature of the invention relates to means whereby the moving parts connected with and controlling the movements of the receiving-pen may be maintained in a state of vibration while the transmitting instrument and receiving instrument are in circuit, so as to reduce the friction of such moving parts. This may be done by mechanical means at the receiving instrument controlled by the line-wire circuit or circuits or by producing vibrations in the currents sent over line.

Another feature of the invention relates to means at the receiving instrument for supplying the receiving-pen with ink.

Figure 1:
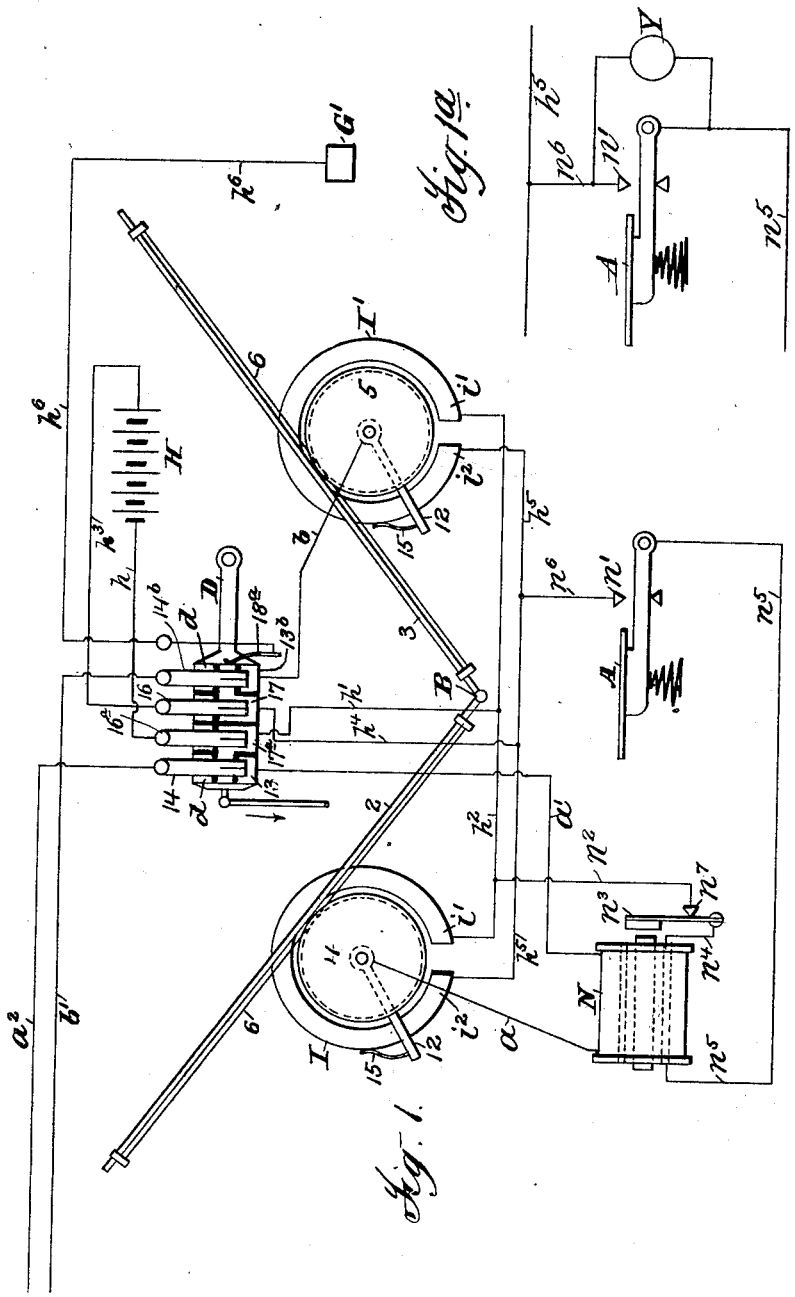
Figure 2:
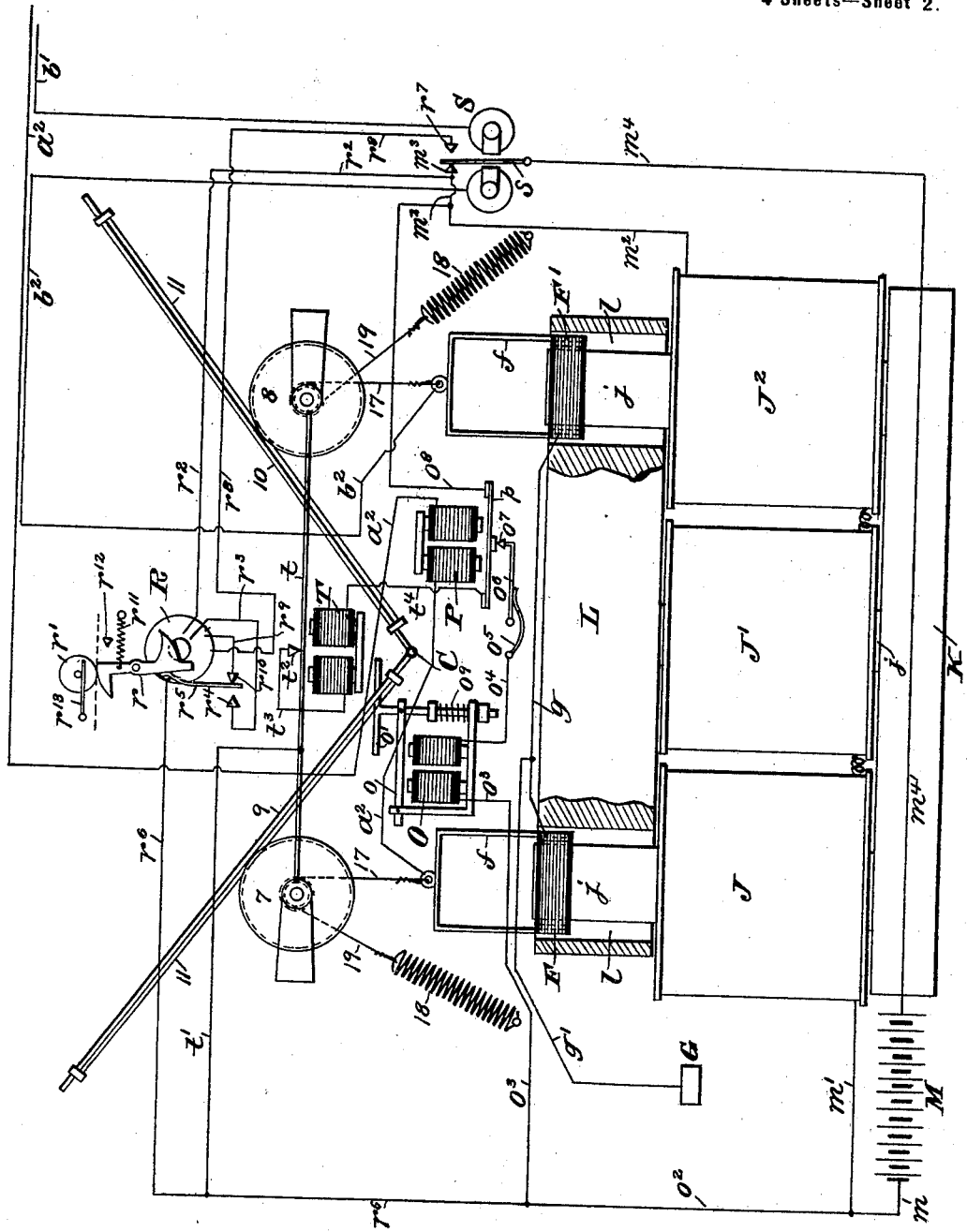
Figure 6:
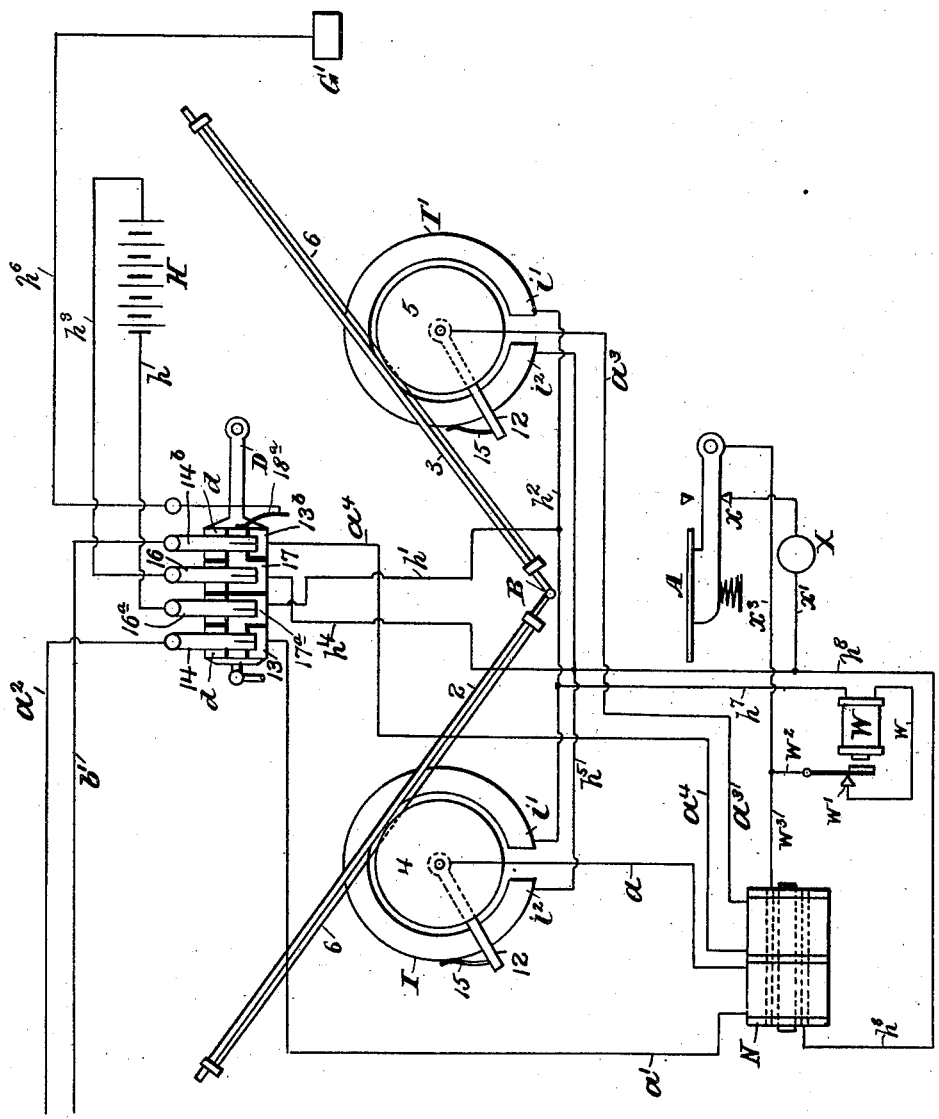

In the accompanying drawings, Figure 1 illustrates, partly in diagram, the transmitting instrument with means for producing vibrations in the line-current to move the receiving-pen from its writing-surface when the transmitting-tracer is raised from its platen, which vibrations may also be made during this period to serve the function of vibrating the moving parts connected with the receiving-pen. Fig. 1ª illustrates a modification of the apparatus shown in Fig. 1. Fig. 2 illustrates in like manner the receiving instrument with mechanical means for vibrating the moving parts connected with the receiving-pen throughout the time the transmitting and receiving instruments are in circuit. Fig. 3 is a plan view of a portion of the receiving instrument, illustrating particularly the means provided by the present invention whereby the receiving-pen is supplied with ink. Figs. 4 and 5 are detail views of the inking device of Fig. 3. Fig. 6 is a diagrammatic view of the transmitting instrument, illustrating a modification of the means for producing vibrations in the main-line circuit to vibrate the moving parts connected with the receiving-pen.

The machine illustrated in the drawings is of that class in which the movements of the receiving-pen in unison with the transmitting-tracer are effected by variations in the strength of the current sent to line from the transmitting instrument to the receiving instrument, such variations in current strength being in turn effected by and corresponding to the movements of the transmitting-tracer.

Referring to said drawings, A represents the writing-platen, and B the transmitting-tracer, which is carried by a pair of hinged arms 2 3, connected to drums 4 5 by cords 6, wound around said drums and secured at their ends to said arms, so that as the transmitting-tracer B is moved in writing and caused to assume different positions along the writing-surface the drums 4 5 are correspondingly rotated. As the drums 4 5 are thus rotated currents of varying strength are sent over line to the receiving instrument, which cause a pair of drums 7 8 at the receiving instrument to rotate in unison with the drums 4 5, all as hereinafter more fully described, and as thus rotated to in turn cause the receiving-pen C (which is carried by arms 9 10, connected to drums 7 8 by cords 11, as in the case of the transmitting-tracer) to move in unison with the transmitting-tracer and to reproduce at the receiving instrument the writing produced or traced by the transmitting-tracer at the transmitting-station.

The main-line circuits from the transmitting instrument to the receiving instrument will now be described. With the master-switch D in closing position, as shown, the circuit from the left-hand side of the transmitting instrument consists of a wire $a$, leading from an arm 12, rotating with the drum 4, to the secondary winding of an induction-coil N, (introduced into this circuit for a purpose hereinafter explained,) wire $a'$, leading from said coil to contact-plate 13 on master-switch D, contact-brush 14, resting on said plate, wire $a^2$, leading to a rectilinearly-movable coil F on the left-hand side of the receiving instrument, and wires $g\ g'$, leading thence to ground at G. The circuit from the right-hand side of the transmitting instrument consists of wire $b$, leading from arm 12, rotating with drum 5, to contact-plate $13^b$ of master-switch D, contact-brush $14^b$, wire $b'$, leading to a polarized relay S on the right-hand side of the receiving instrument, wire $b^2$, leading from said relay to a rectilinearly-movable coil F', (corresponding to coil F on the left-hand side,) and wire $g\ g'$, leading from said coil to earth at G.

Current is supplied to the main-line circuits just described from two local circuits at the transmitting-station, which are independent of the main-line circuits and which include a source of electric energy, as a battery H, and two preferably arc-shaped plates I I', through which current is supplied to the left and right hand main-line circuits, respectively, from said independent circuits. These arc-shaped plates I I' are mounted below the drums 4 5, so as to be engaged by contacts, as brushes 15, carried by the rotating arms 12, through which brushes and arms currents are shunted into the main circuits, which vary in strength according to the positions of said brushes 15 between the ends of said plates I I', as will presently appear. These independent current-supplying circuits will now be described. With the master-switch D in the position in which it is shown in Fig. 1 the negative pole of the battery H is connected by wire $h$, contact-brush $16^a$, contact-plate $17^a$ on the master-switch, and wires $h'\ h^2$ to the terminals $i'$ of the arc-shaped plates I I', while the positive pole of the battery H is connected by wire $h^3$, contact-brush 16, contact-plate 17 on the master-switch D, and wires $h^4\ h^5$ to the opposite terminals $i^2$ of the arc-shaped plates I I'. The positive pole of the battery H is grounded at G', when the master-switch D is in the position shown, by wire $h^6$, connected to contact-spring $18^a$, contacting with plate 17, brush 16, and wire $h^3$, so that with the parts in the positions shown in Fig. 1 a current is passing through each of these independent circuits from the negative pole of battery H and through the plates I I', the brushes 15, and rotating arms 12 to the main-line circuits leading to the receiving instrument. The strength of the currents delivered from these independent circuits to the main-line circuits will, as before stated, depend upon the position of the brushes 15 relatively to the terminals $i'\ i^2$ of the plates I I', since the nearer these brushes are to the terminals $i'$ of said plates the greater the voltage between the brushes 15 and the opposite terminals $i^2$ of said plates or ground, and vice versa, or, in other words, if we assume the voltage of the battery H to be thirty volts and a brush 15 to be one-third the distance from the terminal $i^2$ of a plate I or I' the difference of potential between the brush 15 and ground will be approximately ten volts, and if the brush be midway between the two terminals $i'\ i^2$ the difference of potential between the brush and ground will be approximately fifteen volts. From this construction it results that as the arms 12 are rotated with the drums 4 5 by the movement of the transmitting-tracer the brushes 15 are caused to assume different positions relatively to the terminals $i'\ i^2$ of the plates I I' and to shunt into the main-line circuits currents which vary in strength in accordance with the positions thus assumed by the brushes, the strength of such currents increasing as the brushes 15 approach the terminals $i'$ of said plates and decreasing as they approach the terminals $i^2$ thereof.

The members—namely, the plates I I' and contacts 15—through which currents are supplied from the independent circuits to the main-line circuits may be of any material suitable for the purpose; but I prefer that the members I I' should be of some high-resistance material—such, for example, as carbon—as if such members were of low resistance they might soon be destroyed by the heat of the current passing through them from the battery H.

The means just described for supplying currents of varying strength to the main-line circuits are not claimed herein, as they form the subject-matter of another application, filed by me October 19, 1900, Serial No. 33,590.

The devices provided at the receiving instrument for controlling the movements of the receiving-pen and which are in turn controlled in the extent of their movements in accordance with the strength of the currents shunted into the main-line circuits from the independent circuits at the transmitting instrument consist of the movable coils F F', before referred to, and three electromagnets J J' J², providing suitable magnetic fields for the movement of said coils. These coils are preferably mounted so as to move vertically, as shown, relatively to the core and poles of their magnets, vertical movement of the coils being preferred, because thereby the connections between them and the receiving-pen are much simplified and the friction of the moving parts is very much reduced. The magnets J J' J² rest upon a heel-iron K, with a pole-piece L secured to the top of the core $j$ of the central magnet J', said pole-piece L being provided near its ends with openings $l$, inclosing the cores $j$ of the end magnets J J² and providing space around said cores for the movement vertically of the coils F F', consisting of wire wound, preferably, upon a thin metallic tube, (preferably copper,) secured to a frame $f$ and fitting loosely over the cores $j$, so as to slide freely thereon, the openings $l$ also being of sufficient size to permit such free movement. It will be observed from this construction that each of the coils F F' surrounds one polar extremity of its magnet J or J² and is in turn inclosed or embraced by the pole-pieces of opposite polarity—namely, the pole-piece L.

The coils F F' are suspended from the pen-arm drums 7 8 or the shafts thereof, as shown, (which are horizontal, or substantially so, the receiving-platen in the apparatus shown being vertical, or substantially so,) by means of cords 17, secured at their lower ends to the frame $f$ and wound around said pen-arm drums or their shafts, so that as the coils F F' are moved downwardly they tend to rotate the pen-arm drums 7 8 in one direction against the tension of springs 18, connected by cords 19 to the pen-arm drums or the shafts thereof, and which tend to rotate said drums in the opposite direction. The electromagnets J J' J² are excited separately from the coils F and F' by the following circuit: wires $m\ m'$, leading from the negative pole of a local battery M, coils of magnets J J' J², wire $m^2$, contact $m^3$, armature $s$ of the relay S, and wire $m^4$ to the positive pole of battery M.

The operation of the apparatus as thus far described is as follows: Assuming the master-switch D to be in the position in which it is shown in Fig. 1 and the transmitting-tracer and receiving-pen to be in writing position upon the paper, as the transmitting-tracer is moved by the operator in writing the drums 4 5 are rotated through the connections described in one direction or the other and to an extent dependent upon the direction and extent of movement of the transmitting-tracer and its arms 2 3. As the drums 4 5 are thus rotated the arms 12, rotating therewith, will move their brushes 15 over the peripheries of the arc-shaped plates I I', thus causing said brushes to assume different positions relatively to the two terminals $i'\ i^2$ of said plates. As the brushes 15 are thus moved over the peripheries of the plates I I' currents of varying strength are shunted into the main-line circuits from the left-hand side of the transmitter through wire $a$, secondary winding of induction-coil N, wire $a'$, plate 13, contact-brush 14, wire $a^2$, coil F, and wires $g\ g'$ to ground, and from the right-hand side of the transmitter through wire $b$, plate $13^b$, contact-brush $14^b$, wire $b'$, relay S, wire $b^2$, coil F', and wires $g\ g'$ to ground. As such currents are sent over the main-line circuits they will in passing through the coils F F' cause the latter to assume different positions vertically in their magnetic fields in accordance with the strength of the currents, and thus effect rotation of the pen-arm drums 7 8 and movement of the receiving-pen C in unison with the drums 4 5 and the transmitting tracer, respectively, it being understood that when currents of increased strength are shunted into the main-line circuits by the movement of the brushes 15 toward the terminals $i'$ of the plates I I' the coils F F' will be drawn downwardly, and thus through their cords 17 rotate the pen-arm drums 7 8, and that when currents of decreased strength are shunted into the main-line circuits by the movement of the brushes 15 toward the terminals $i^2$ of the plates I I' the pull of the coils F F' upon the pen-arm drums 7 8 will be relaxed and such pen-arm drums then rotated in the opposite direction and the coils F F' moved upwardly in their magnetic fields by the springs 18. In this operation it will be observed that the magnets J J² act by attraction to move the coils F F' to actuate the receiving-pen; but the operation of the magnets might be reversed—that is to say, these magnets might act repulsively upon these coils to so move them.

The means just described at the receiving instrument for controlling the movements of the receiving-pen in accordance with variations in current strength are not claimed herein, as they form part of the subject-matter of the application hereinbefore referred to, filed by me October 19, 1900, Serial No. 33,590.

The pen-lifting mechanism and circuits for operating the same controlled from the transmitting instrument provided by the present invention will now be described. This pen-lifting mechanism in the form shown in Figs. 1 and 2 consists of a magnet O, the armature $o$ of which is provided with a pen-supporting arm $o'$, which when the armature $o$ is released by the magnet O engages the pen-arm 9 and moves the receiving-pen C from the paper. The magnet O is energized from a local circuit consisting of wires $m\ o^2\ o^3$, leading from the negative pole of battery M, wire $o^4$, spring $o^5$, pivoted arm $o^6$, contact $o^7$, the armature $p$ of a relay P, which is in series with the main-line wire $a^2$, wire $o^8$, leading from the armature $p$ to wire $m^2$ and contact $m^3$, armature $s$ of relay S, and wire $m^4$ to the positive pole of battery M. The condition of this local circuit and through it the condition of the magnet O is controlled, so as to effect the movement of the receiving-pen to and from the writing-surface by the transmitting-platen A in the following manner: During the writing operation and while the platen A is in the depressed position, in which it is shown in Fig. 1, the relay P, being energized by the main-line circuit $a^2$, will attract its armature $p$. The pivoted arm $o^6$ of the local circuit of the magnet O, however, will follow the armature $p$, being held in contact therewith by the spring $o^5$, thus maintaining the local circuit of the magnet O closed. With this local circuit closed the magnet O is energized, attracting its armature $o$ and moving the pen-supporting arm $o'$ out of supporting position, with the result that the receiving-pen C is moved into contact with the writing-surface. When the transmitting-tracer is raised from the writing-platen A, the latter rises and engages a contact $n'$, and thus closes a local circuit from the negative pole of the battery H through wire $h$, contact-brush $16^a$, plate $17^a$, wires $h'\ h^2\ n^2$, vibrator $n^3$, wire $n^4$, primary winding of induction-coil N, wire $n^5$ to the writing-platen, and thence by wires $n^6\ h^5\ h^4$, contact-plate 17, contact-brush 16, and wire $h^3$ to the positive pole of battery H. As this circuit is thus closed the interrupter or vibrator $n^3$ is attracted by coil N, so as to be moved away from contact $n^7$ of wire $n^2$, thus breaking this local circuit, when the vibrator $n^3$ moves away from the coil N and again engages contact $n^7$, reëstablishing the circuit and so on so long as the platen A remains in its raised position. Vibratory currents are thus induced upon the left-hand main-line wire $a^2$ and through relay P by the induction-coil N, thus vibrating the armature $p$ of said relay. The rate or strength of vibration of the armature $p$ of relay P is greater than that of which the pivoted arm $o^6$ is capable, so that the latter cannot make effective contact therewith, and the current through the local circuit of magnet O is therefore repeatedly interrupted during the vibration of armature $p$, with the result that the average strength of current through magnet O is diminished to such an extent as to cause said magnet to release its armature $o$. As the armature $o$ is thus released, the pen-supporting arm $o'$ is moved by a spring $o^9$ into supporting position, thus raising the receiving-pen from the paper. These vibratory currents through the relay P continue as long as the transmitting-tracer is out of contact with the platen A and the latter remains in its raised position. As soon, however, as the transmitting-tracer is returned to engagement with the platen A, the latter is depressed out of engagement with contact $n'$, when the local circuit through the vibrator $n^3$ will be broken and the vibratory currents through the relay P cease, thus reclosing the local circuit from the battery M, through magnet O, by the engagement of the pivoted arm $o^6$ with the armature $p$ of relay P, the magnet O then attracting its armature $o$ and withdrawing arm $o'$ from supporting position, when the receiving-pen will move into contact with the paper. The vibratory currents thus sent over line may, as before stated, and do serve also the function of vibrating the coils F and F' and other moving parts connected with the receiving-pen. Mechanical means are also provided for this purpose which will presently be described, and means are also provided, which will also be described, whereby the currents sent over both line-wires are constantly interrupted throughout the time the transmitting instrument and receiving instrument are in circuit for the same purpose.

After the writing operation is completed or when it is desired to shift the paper at the receiving end the master-switch D will be moved in the direction indicated by the arrow in Fig. 1, so as to bring four insulated plates $d$ borne by the switch into engagement with the brushes 14 $14^b$ 16 $16^a$ $18^a$, thus opening the main-line circuits. Before the switch D reaches this position, however, the main-line wires $b'$ and $a^2$ will be momentarily connected to the positive and negative poles, respectively, of the battery H, through contact-plates 17 and $17^a$, respectively, thus reversing in polarity the current over right line-wire $b'$ to what it was during the writing operation, with the result that the armature $s$ of relay S will be biased away from contact $m^3$ and against a contact $r^7$, thus opening the local circuits described in the receiver and closing the paper-shifting circuit at the receiving end, as hereinafter described. When the main-line circuits $a^2$ and $b'$ are thus opened by the master-switch D, the coils F F' are deënergized and then moved upwardly through their magnetic fields by the springs 18, which also rotate the pen-arm drums 7 8, and through the pen-arms 9 10 move the receiving-pen to its unison-point. Means are provided by the present invention for inking the receiving-pen when it is thus moved to its unison-point, which means will now be described. The means shown for so inking the receiving-pen at its unison-point consists of an ink-well U, provided with suitable absorbent material, preferably sponge-rubber, projecting from the ink-well in proper position for engagement with the receiving-pen as the latter arrives at its unison-point. Any suitable form of receiving-pen may be used in connection with this inking device; but I prefer to use the one shown, which, however, forms of itself no part of my invention and is merely selected for the purposes of illustration as one form of pen which may be used in connection with the inking device shown. This pen consists of a stem $c$, secured to the pen-arms 9 10 in any suitable manner and inclosed by a cup $c'$, held in position upon the stem above the lower end thereof by engagement with a groove $c^2$, formed in said stem. The lower end of said stem, which forms the pen-point, is split or grooved longitudinally, as shown in Fig. 4, and the interior surface of the cup $c'$, the lower end of which is split, is threaded, as shown, so that upon inserting the lower end of the pen in a supply of ink or in absorbent material filled with ink said pen will supply itself with ink by capillary attraction, or, if desired, the pen may be inked by filling the cup $c'$ from the top. Where sponge-rubber or similar absorbent material is employed, the portion thereof projecting from the ink-well will preferably be provided with a recess, as $u'$, for receiving the pen as it comes to its unison-point, so that the pen may embed itself in or be embraced by the absorbent material and more freely supplied with ink. The ink-well U may be supported at the unison-point in any suitable manner. As shown, it is so supported upon a bracket $u^3$, secured to the frame $u^4$ of the transmitting instrument, with the ink-supplying opening of the ink-well located in a recess in one of the paper-guides $u^5$, the bracket $u^3$ being provided with projections $u^6$ for retaining the ink-well U in proper position.

Any suitable form of paper-shifting mechanism may be employed at the receiving instrument for shifting the paper after the completion of a line of writing or at other desired times. A convenient form of mechanism for this purpose and one which is commonly used in telautographs is illustrated in Fig. 2 and will now be briefly described. This paper-shifting mechanism consists of a magnet R, rocking armature $r$ therefor, and a vertically-movable iron roll $r'$, which coacts with the upper end of the armature $r$ when the latter is attracted by the magnet R to grip the paper and move it forward. The magnet R is energized for the purpose of attracting its armature $r$ and feeding the paper by a local circuit controlled by the armature $s$ of relay S and consisting of wire $m^4$ from the positive pole of battery M, armature $s$, contact $m^3$, wire $r^2$ to the inside of the inner winding of magnet R, (this magnet having two windings, both of the same direction,) and wire $r^3$ from the outer terminal of the inner winding of said magnet to contact $r^4$, spring-arm $r^5$, wires $r^6$, $o^2$, and $m$ to the negative pole of the battery M. The armature $r$ is shown in the position it assumes after having shifted the paper, with its spring-arm $r^5$ out of engagement with the contact $r^4$. Before the movement of the armature $r$ to this position the spring-arm $r^5$ is in engagement with said contact $r^4$, thus closing the circuit described from the battery M, so that when the master-switch D at the transmitting-station is moved to the position in which it is shown in Fig. 1 a negative current is sent over line-wire $b'$, as before described, through the relay-magnet S, thus biasing the armature $s$ of said relay against contact $m^3$ and completing the local paper-shifting circuit just described. The magnet R being thus energized will attract the armature $r$, rocking it into the position in which it is shown in Fig. 2, the roller $r'$ (which is of iron) being attracted by the armature, so as to grip the paper between it and said armature. As the armature $r$ is moved to this position its spring-arm $r^5$ is moved out of engagement with contact $r^4$, thus breaking the local circuit described from battery M, this movement of spring-arm $r^5$ away from contact $r^4$ taking place at about the end of the shifting movement of the armature $r$. The armature $r$ is held in this position against the core of magnet R by residual magnetism during the writing operation, and so long as the master-switch D remains in the position in which it is shown in Fig. 1. When, however, the master-switch D at the transmitting-station is moved in the direction indicated by the arrow, as before described, to open the main-line circuits $a^2$ $b'$, a reverse current is sent over the line $b'$, through relay-magnet S, by the momentary engagement of contact-plate 17 with contact-brush $14^b$, thus biasing the armature $s$ against contact $r^7$, when the following circuit will be established between the battery M and paper-shifting magnet R: wire $m^4$ from the positive pole of said battery to armature $s$, contact $r^7$, wire $r^8$ to the outer terminal of the outside winding of magnet R, (which is of comparatively high resistance,) wire $r^9$ from inside of the outer winding, contact $r^{10}$, spring-arm $r^5$, and thence by wires $r^6$, $o^2$, and $m$ to the negative pole of battery M. Upon the formation of this circuit current will pass through the outer winding of the paper-shifting magnet R in the opposite direction to that heretofore described for energizing the magnet R to shift the paper, which will tend to magnetize the core of magnet R of reverse polarity, thus clearing out the residual magnetism and allowing a spring $r^{11}$ to rock the armature $r$ from the position in which it is shown and against a back-stop $r^{12}$ and in position for again shifting the paper when the main-line circuit $b'$ is again closed and the armature $s$ biased against contact $m^3$. Immediately upon the discharge of the core of magnet R the roller $r'$ is released and raised by its spring $r^{13}$, thus releasing the paper.

In order to secure accurate movement of the receiving-pen in a telautographic apparatus in unison with the transmitting-tracer, it is necessary that the devices provided at the receiving instrument for controlling the movement of the receiving-pen should move with as little friction as possible, and I have discovered that the friction between these moving parts can be very materially reduced if such moving parts be subjected to vibration during the writing operation. In Fig. 2 of the drawings I have shown means for so vibrating these moving parts controlled from the transmitting instrument, which means will now be described. The means shown for this purpose in Figs. 1 and 2 consist of a light resilient rod $t$, of suitable material, connecting the bearings of the pen-arm drums 7 8 and which is kept in a constant state of vibration during the writing operation and while the armature $s$ of the relay S is against the contact $m^3$ by means of a magnet T, connected to the negative pole of battery M by wires $m$ $o^2$ $r^6$ $t'$, rod $t$, contact $t^2$, and wire $t^3$ and to the positive pole of said battery by wire $m^4$, armature $s$ of relay S, contact $m^3$, wires $m^2$ $o^3$, armature $p$ of relay P, and wire $t^4$, leading from said armature to the magnet T. This local circuit for the magnet T is controlled by the armature $s$ and master-switch D, so that when said armature is against the contact $m^3$ the circuit from battery M to magnet T is closed, and this is the condition of this circuit throughout the writing operation and so long as the master-switch D remains in the position shown in Fig. 1. When this local circuit is thus closed, the rod $t$ is kept constantly in a state of vibration by the magnet T, such rod when attracted by the magnet T moving away from contact $t^2$, thus opening the circuit from battery M to magnet T, and when released by the magnet T reëngaging contact $t^2$ and reclosing this circuit, and so on, so long as the writing operation continues and the armature $s$ remains in the position in which it is shown in Fig. 2. When the armature $s$ is moved from this position and biased against the contact $r^7$ by the movement of the master-switch D in the direction of the arrow in Fig. 1, as hereinbefore described, this local circuit, like the other local circuits before described, is opened.

In Fig. 6 is shown another way of vibrating the moving parts in the receiving instrument during all the time the transmitting and receiving instruments are in circuit, which may be used in place of or in addition to the rod $t$ and the electrical devices in the receiving instrument described for vibrating said rod.

In the construction shown in Fig. 6 the induction-coil N has two secondary windings, one connected by wire $a$ to the arm 12 at the left-hand side of the machine and by wire $a'$ to contact-plate 13, and by contact-brush 14 thence to main-line wire $a^2$, and the other by wire $a^3$ to the arm 12 at the right-hand side of the transmitter and by wire $a^4$ to contact-plate $13^b$ and by contact-brush $14^b$, thence to the main-line circuit $b'$, the two main-line wires $a^2$ and $b'$ being thus connected in series with the secondary windings of the induction-coil N. The negative pole of battery H is connected by wire $h$, brush $16^a$, contact-plate $17^a$, wires $h'$, $h^2$, $h^7$, vibrator-magnet W, wire $w$, contact $w'$, vibrator $w^2$, and wires $w^3$ to one terminal of the primary winding of the induction-coil N, while the positive pole of said battery is connected by wire $h^3$, contact-brush 16, contact-plate 17, wire $h^4$, and wire $h^8$ to the opposite terminal of the primary winding of said induction-coil.

The operation of this apparatus as thus far described is as follows: With the master-switch D in the position shown a negative current is on line from battery H, through the secondary windings of the induction-coil N, to the main-line wires $a^2$ $b'$, and the battery H is also in circuit with the vibrator-magnet W, with the result that the vibrator $w^2$ is vibrated by said magnet into and out of engagement with contact $w'$ of said wire $w$, thus making and breaking the circuit from battery H, through the primary winding of the induction-coil N, and inducing vibratory currents in the secondary windings of the induction-coil N and main-line wires $a^2$ $b'$, which vibratory currents cause coils F F' and the other moving parts connected with the receiving-pen to vibrate, as heretofore described in connection with Figs. 1 and 2. These vibratory currents continue so long as the master-switch D remains in the position shown in Fig. 6 and whether the writing-platen A be depressed or elevated, with this difference, however, that in the elevated position of the platen such vibratory currents have greater strength than when said writing-platen is depressed, means being provided under the control of the writing-platen A whereby when the writing-platen is depressed the strength of such vibratory currents is reduced, as will presently be described. The vibratory currents traversing the main-line wires $a^2$ $b'$ when the writing-platen A is in its elevated position are of such strength as to cause the necessary vibration of the armature $p$ of relay P, Fig. 2, to diminish the current passing through the magnet O, so that the armature of the latter will be held away from it by the spring $o^9$ and the pen-supporting arm $o'$ moved into position to maintain the receiving-pen out of contact with the paper. Upon the depression of the writing-platen A by the pressure of the transmitting-tracer, however, it engages a contact $x$, thus closing a branch circuit consisting of wires $x'$ $h^8$, primary winding of induction-coil N, wires $w^3$ $x^3$, and the writing-platen, thus introducing a resistance X around the primary winding of the induction-coil, which reduces the strength of the vibratory currents through the primary winding of the induction-coil N, and consequently the strength of the vibratory currents induced in the secondary windings of said induction-coil and traversing the main-line wires $a^2$ $b'$, these vibratory currents traversing the main-line wires $a^2$ $b'$ being so reduced in strength as to diminish the vibration of the armature $p$ of relay P, and thus extend the duration of contact between said armature $p$ and pivoted arm $o^6$, with the result that currents of sufficient strength are sent from battery M through the magnet O to energize it, so that it will attract its armature and withdraw the pen-arm support $o'$ from supporting position, thus causing the receiving-pen to move into contact with its writing-surface, in which position it remains so long as the writing-platen A is in its depressed position. The same result of continuous vibration of the current traversing a line-wire attained in Fig. 6 may be attained on one line-wire—namely, line-wire $a^2$ in the construction shown in Fig. 1—by connecting up a resistance Y, as shown in Fig. $1^a$, to wire $n^5$ and wire $n^6$, so that vibrating currents will be sent over line in both the raised and lowered positions of the platen, such currents being weaker in the lowered position of the platen by reason of the introduction of the resistance Y into the primary winding of induction-coil N in this position of the platen.

The several features of the present invention are not limited to the precise construction and arrangement of devices described, and many modifications and changes may be made therein without departing from the spirit of this invention.

The methods disclosed by this application are not claimed herein, but form the subject-matter of an application filed by me December 21, 1900, Serial No. 40,636.

What is claimed is—

1. In a teleautographic apparatus, the combination of a main-line circuit, a transmitting-tracer, a receiving-pen, a magnet controlling the movement of said pen to and from its writing-surface, means controlled by the transmitting-tracer for causing vibratory currents to traverse the main-line circuit to effect the movement of the pen in one of these directions, a local circuit for said magnet, and a relay controlling said local circuit and connected in series with the main-line circuit, substantially as described.

2. In a telautographic apparatus, the combination of a main-line circuit, a transmitting-tracer, a receiving-pen, a magnet controlling the movement of said pen to and from its writing-surface, an induction-coil the secondary winding of which is connected with the main-line circuit, means controlled by the transmitting-tracer for closing the circuit through the primary winding of said induction-coil and causing vibratory currents to traverse said primary winding and the main-line circuit to effect the movement of the pen in one of these directions, a local circuit for said magnet, and a relay controlling said local circuit and connected in series with the main-line circuit, substantially as described.

3. In a telautographic apparatus, the combination of a main-line circuit, a transmitting-tracer, a receiving-pen, a magnet controlling the movement of said pen to and from its writing-surface, an induction-coil the secondary winding of which is connected in series with the main-line circuit, means controlled by the transmitting-tracer for closing the circuit through the primary winding of said induction-coil and causing vibratory currents to traverse said primary winding and the main-line circuit to effect the movement of the pen in one of these directions, and electrical connections between said magnet and the main-line circuit, substantially as described.

4. In a telautographic apparatus, the combination of a main-line circuit, a transmitting-tracer, a receiving-pen, a magnet controlling the movement of said pen to and from its writing-surface, an induction-coil the secondary winding of which is connected in series with the main-line circuit, means controlled by the transmitting-tracer for closing the circuit through the primary winding of said induction-coil and causing vibratory currents to traverse said primary winding and the main-line circuit to effect the movement of the pen in one of these directions, a local circuit for said magnet, and a relay controlling said local circuit and connected with the main-line circuit, substantially as described.

5. In a telautographic apparatus, the combination of a main-line circuit, a transmitting-tracer, a receiving-pen, a magnet controlling the movement of said pen to and from its writing-surface, an induction-coil the secondary winding of which is connected in series with the main-line circuit, means controlled by the transmitting-tracer for closing the circuit through the primary winding of said induction-coil and causing vibratory currents to traverse said primary winding and the main-line circuit to effect the movement of the pen in one of these directions, a local circuit for said magnet, and a relay controlling said local circuit and connected in series with the main-line circuit, substantially as described.

6. In a telautographic system in which the movements of the receiving-pen in unison with the transmitting-tracer are effected by variations in current strength on line, the combination of a receiving-pen, a main-line circuit, devices controlled thereby and in turn controlling the movements of the receiving-pen, and means at the receiving-station controlled by the main-line circuit for vibrating said devices to reduce friction, substantially as described.

7. In a telautographic system in which the movements of the receiving-pen in unison with the transmitting-tracer are effected by variations in current strength on line, the combination of a receiving-pen, a main-line circuit, devices controlled thereby and in turn controlling the movements of the receiving-pen, and means at the receiving-station controlled by the main-line circuit for vibrating said devices to reduce friction, said means including a vibrating member connected to said devices, substantially as described.

8. In a telautographic system in which the movements of the receiving-pen in unison with the transmitting-tracer are effected by variations in current strength on line, the combination of a receiving-pen, a main-line circuit, devices controlled thereby and in turn controlling the movements of the receiving-pen, and means at the receiving-station controlled by the main-line circuit for vibrating said devices to reduce friction, said means including a vibrating member connected to said devices, a magnet for such vibrating member and a local circuit for said magnet controlled from the main-line circuit, substantially as described.

9. In a telautographic system in which the movements of the receiving-pen in unison with the transmitting-tracer are effected by variations in current strength on line, the combination of a receiving-pen, a main-line circuit, devices controlled thereby and in turn controlling the movements of the receiving-pen, suitable supports for said devices, and means for vibrating said devices to reduce friction comprising a vibrating bar connected to said supports, a magnet for vibrating said bar, and a local circuit for said magnet controlled from the main-line circuit, substantially as described.

10. In a telautographic system in which the movements of the receiving-pen in unison with the transmitting-tracer are effected by variations in current strength on line, the combination of a receiving-pen, a main-line circuit, devices controlled thereby and in turn controlling the movements of the receiving-pen and means for producing vibrations in the current traversing the main-line circuit, for vibrating such devices to reduce friction, said means including an induction-coil the secondary winding of which is connected with the main-line circuit and the primary winding of which includes a suitable interrupter, substantially as described.

11. In a telautographic system in which the movements of the receiving-pen in unison with the transmitting-tracer are effected by variations in current strength on line, the combination of a receiving-pen, a main-line circuit, devices controlled thereby and in turn controlling the movements of the receiving-pen, and means for producing vibrations in the current traversing the main-line circuit for vibrating such devices to reduce friction, said means including an induction-coil the secondary winding of which is connected in series with the main-line circuit and the primary winding of which includes a suitable interrupter, substantially as described.

12. In a telautographic system in which the movements of the receiving-pen in unison with the transmitting-tracer are effected by variations in current strength on line, the combination of a transmitting instrument, a receiving instrument, a receiving-pen, a main-line circuit, devices controlled thereby and in turn controlling the movements of the receiving-pen, and means for producing vibrations in the current traversing the main-line circuit for vibrating such devices to reduce friction throughout the time that the transmitting and receiving instruments are in circuit, said means including an induction-coil the secondary winding of which is connected with the main-line circuit and the primary winding of which includes a suitable interrupter, substantially as described.

13. In a telautographic system in which the movements of the receiving-pen in unison with the transmitting-tracer are effected by variations in current strength on line, the combination of a transmitting instrument, a receiving instrument, a receiving-pen, a main-line circuit devices controlled thereby and in turn controlling the movements of the receiving-pen, and means for producing vibrations in the current traversing the main-line circuit for vibrating such devices, to reduce friction, throughout the time that the transmitting and receiving instruments are in circuit, said means including an induction-coil, the secondary winding of which is connected in series with the main-line circuit and the primary winding of which includes a suitable interrupter, substantially as described.

14. In a telautographic system in which the movements of the receiving-pen in unison with the transmitting-tracer are effected by variations in current strength on line, the combination of a receiving-pen, two main-line circuits, devices controlled thereby and in turn controlling the movements of the receiving-pen, and means for producing vibrations in the currents traversing the two main-line circuits for vibrating such devices to reduce friction, substantially as described.

15. In a telautographic system in which the movements of the receiving-pen in unison with the transmitting-tracer are effected by variations in current strength on line, the combination of a transmitting instrument, a receiving instrument, a receiving-pen, two main-line circuits, devices controlled thereby and in turn controlling the movements of the receiving-pen, and means for producing vibrations in the currents traversing the two main-line circuits for vibrating such devices, to reduce friction, throughout the time the transmitting and receiving instruments are in circuit, substantially as described.

16. In a telautographic system in which the movements of the receiving-pen in unison with the transmitting-tracer are effected by variations in current strength on line, the combination of a receiving-pen, two main-line circuits, devices controlled thereby and in turn controlling the movements of the receiving-pen, and means for producing vibrations in the current traversing the two main-line circuits for vibrating such devices to reduce friction, said means including an induction-coil having two secondary windings which are connected with the main-line circuits and the primary winding of which includes a suitable interrupter, substantially as described.

17. In a telautographic system in which the movements of the receiving-pen in unison with the transmitting-tracer are effected by variations in current strength on line, the combination of a receiving-pen, two main-line circuits, devices controlled thereby and in turn controlling the movements of the receiving-pen, and means for producing vibrations in the currents traversing the two main-line circuits for vibrating such devices to reduce friction, said means including an induction-coil having two secondary windings which are connected in series with the main-line circuits and the primary winding of which includes a suitable interrupter, substantially as described.

18. In a telautographic system in which the movements of the receiving-pen in unison with the transmitting-tracer are effected by variations in current strength on line, the combination of a transmitting instrument, a receiving instrument, a receiving-pen, two main-line circuits, devices controlled thereby and in turn controlling the movements of the receiving-pen, and means for producing vibrations in the currents traversing the two main-line circuits for vibrating said devices, to reduce friction throughout the time that the transmitting and receiving instruments are in circuit, said means including an induction-coil having two secondary windings which are connected with the main-line circuits and the primary winding of which includes a suitable interrupter, substantially as described.

19. In a telautographic system in which the movements of the receiving-pen in unison with the transmitting-tracer are effected by variations in current strength on line, the combination of a transmitting instrument, a receiving instrument, a receiving-pen, two main-line circuits, devices controlled thereby and in turn controlling the movements of the receiving-pen, and means for producing vibrations in the currents traversing the two main-line circuits for vibrating said devices, to reduce friction, throughout the time that the transmitting and receiving instruments are in circuit, said means including an induction-coil, having two secondary windings which are connected in series with the main-line circuits and the primary winding of which includes a suitable interrupter, substantially as described.

20. In a telautographic system in which the movements of the receiving-pen in unison with the transmitting-tracer are effected by variations in current strength on line, the combination of a transmitting instrument, a receiving instrument, a receiving-pen, a main-line circuit, devices controlled thereby and in turn controlling the movements of the receiving-pen, means for producing vibrations in the current traversing the main-line circuit for vibrating such devices to reduce friction throughout the time that the transmitting and receiving instruments are in circuit, means controlled by the transmitting-tracer for varying the strength of such vibrations, a magnet controlling the movement of the receiving-pen to and from its writing-surface, and electrical connections between the magnet and the main-line circuit whereby as vibrations of one strength traverse the main-line circuit the receiving-pen is caused to move in one direction and when vibrations of different strength traverse the main-line circuit it is caused to move in the other direction, substantially as described.

21. In a telautographic system in which the movements of the receiving-pen in unison with the transmitting-tracer are effected by variations in current strength on line, the combination of a transmitting instrument, a receiving instrument, a receiving-pen, a main-line circuit, devices controlled thereby and in turn controlling the movements of the receiving-pen, means for producing vibrations in the current traversing the main-line circuit, for vibrating said devices to reduce friction throughout the time that the transmitting and receiving instruments are in circuit, said means including an induction-coil the secondary winding of which is connected with the main-line circuit and the primary winding of which includes a suitable interrupter, means controlled by the transmitting-tracer for varying the strength of such vibrations, a magnet controlling the movement of the receiving-pen to and from its writing-surface, and electrical connections between the magnet and the main-line circuit whereby as vibrations of one strength traverse the main-line circuit the receiving-pen is caused to move in one direction and when vibrations of different strength traverse the main-line circuit it is caused to move in the other direction, substantially as described.

22. In a telautographic system in which the movements of the receiving-pen in unison with the transmitting-tracer are effected by variations in current strength on line, the combination of a transmitting instrument, a receiving instrument, a receiving-pen, a main-line circuit, devices controlled thereby and in turn controlling the movements of the receiving-pen, means for producing vibrations in the current traversing the main-line circuits for vibrating said devices to reduce friction throughout the time the transmitting and receiving instruments are in circuit, said means including an induction-coil the secondary winding of which is connected in series with the main-line circuit and the primary winding of which includes a suitable interrupter, means controlled by the transmitting-tracer for varying the strength of such vibrations, a magnet controlling the movement of the receiving-pen to and from its writing-surface, and electrical connections between the magnet and the main-line circuit whereby as vibrations of one strength traverse the main-line circuit the receiving-pen is caused to move in one direction and when vibrations of different strength traverse the main-line circuit it is caused to move in the other direction, substantially as described.

23. In a telautographic system in which the movements of the receiving-pen in unison with the transmitting-tracer are effected by variations in current strength on line, the combination of a receiving-pen, a main-line circuit, a movable coil in said circuit connected to and controlling the movements of the receiving-pen, a magnetic field for said coil, and means at the receiving-station controlled by the main-line circuit for vibrating said coil and parts connecting it with said pen to reduce friction, substantially as described.

24. In a telautographic system in which the movements of the receiving-pen in unison with the transmitting-tracer are effected by variations in current strength on line, the combination of a receiving-pen, a main-line circuit, a rectilinearly-movable coil in said circuit connected to and controlling the movements of the receiving-pen, a magnetic field for said coil, and means at the receiving-station controlled by the main-line circuit for vibrating said coil and parts connecting it with said pen to reduce friction, substantially as described.

25. In a telautographic system in which the movements of the receiving-pen in unison with the transmitting-tracer are effected by variations in current strength on line, the combination of a receiving-pen, a main-line circuit, a vertically-movable coil in said circuit connected to and controlling the movements of the receiving-pen, a magnetic field for said coil, and means at the receiving-station controlled by the main-line circuit for vibrating said coil and parts connecting it with said pen to reduce friction, substantially as described.

26. In a telautographic system in which the movements of the receiving-pen in unison with the transmitting-tracer are effected by variations in current strength on line, the combination of a receiving-pen, a main-line circuit, a movable coil in said circuit connected to and controlling the movements of the receiving-pen, and means for producing vibrations in the current traversing the main-line circuit for vibrating said coil and parts connecting it with said pen to reduce friction, substantially as described.

27. In a telautographic system in which the movements of the receiving-pen in unison with the transmitting-tracer are effected by variations in current strength on line, the combination of a receiving-pen, a main-line circuit, a rectilinearly-movable coil in said circuit connected to and controlling the movements of the receiving-pen, and means for producing vibrations in the current traversing the main-line circuit for vibrating said coil and parts connecting it with said pen to reduce friction, substantially as described.

28. In a telautographic system in which the movements of the receiving-pen in unison with the transmitting-tracer are effected by variations in current strength on line, the combination of a receiving-pen, a main-line circuit, a vertically-movable coil in said circuit connected to and controlling the movements of the receiving-pen, and means for producing vibrations in the current traversing the main-line circuit for vibrating said coil and parts connecting it with said pen to reduce friction, substantially as described.

29. In a telautographic apparatus, the combination of a main-line circuit, a transmitting-tracer, an independent circuit including a source of electric energy, means controlled by the transmitting-tracer for shunting from said independent circuit, into the main-line circuit currents varying in strength according to the movements of the transmitting-tracer, a receiving-pen, a magnet controlling the movement of said pen to and from its writing-surface, means controlled by the transmitting-tracer for producing vibrations in the main-line circuit to effect the movement of the pen in one of these directions, and electrical connections between said magnet and the main-line circuit substantially as described.

30. In a telautographic apparatus, the combination of a main-line circuit, a transmitting-tracer, an independent circuit including a source of electric energy, means controlled by the transmitting-tracer for shunting from said independent circuit into the main-line circuit currents varying in strength according to the movements of the transmitting-tracer, a receiving-pen, a magnet controlling the movement of said pen to and from its writing-surface, means controlled by the transmitting-tracer for producing vibrations in the main-line circuit to effect the movement of the pen in one of these directions, a local circuit for said magnet, and a relay controlling said local circuit, and connected with the main-line circuit, substantially as described.

31. In a telautographic apparatus, the combination of a main-line circuit, a transmitting-tracer, an independent circuit including a source of electric energy, means controlled by the transmitting-tracer for shunting from said independent circuit into the main-line circuit currents varying in strength according to the movements of the transmitting-tracer, a receiving-pen, a magnet controlling the movement of said pen to and from its writing-surface, an induction-coil the secondary winding of which is connected with the main-line circuit, means controlled by the transmitting-tracer for closing the circuit through the primary winding of said induction-coil and producing vibrations in the currents traversing the main-line circuit to effect the movement of the pen in one of these directions, and electrical connections between said magnet and the main-line circuit, substantially as described.

32. In a telautographic apparatus, the combination of a main-line circuit, a transmitting-tracer, an independent circuit including a source of electric energy, means controlled by the transmitting-tracer for shunting from said independent circuit into the main-line circuit currents varying in strength according to the movements of the transmitting-tracer, a receiving-pen, a magnet controlling the movement of said pen to and from its writing-surface, an induction-coil the secondary winding of which is connected with the main-line circuit, means controlled by the transmitting-tracer for closing the circuit through the primary winding of said induction-coil and producing vibrations in the currents traversing the main-line circuit to effect the movement of the pen in one of these directions, a local circuit for said magnet, and a relay controlling said local circuit and connected with the main-line circuit, substantially as described.

33. In a telautographic apparatus the combination of a main-line circuit, a transmitting-tracer, a receiving-pen, an independent circuit including a source of electric energy, means controlled by the transmitting-tracer for shunting from said independent circuit into the main-line circuit currents varying in strength according to the movements of the transmitting-tracer, devices controlled thereby and connected to and controlling the movements of the receiving-pen, and means for producing vibrations in the currents traversing the main-line circuits for vibrating such devices to reduce friction, substantially as described.

34. In a telautographic apparatus, the combination of a main-line circuit, a transmitting-tracer, a receiving-pen, an independent circuit including a source of electric energy, means controlled by the transmitting-tracer for shunting from said independent circuit into the main-line circuit currents varying in strength according to the movements of the transmitting-tracer, devices controlled thereby and connected to and controlling the movements of the receiving-pen, and means for producing vibrations in the currents traversing the main-line circuits for vibrating such devices to reduce friction, said means including an induction-coil the secondary winding of which is connected with the main-line circuit and the primary winding of which includes a suitable interrupter, substantially as described.

35. In a telautographic apparatus, the combination of a main-line circuit, a transmitting-tracer, a receiving-pen, an independent circuit including a source of electric energy, means controlled by the transmitting-tracer for shunting from said independent circuit into the main-line circuit currents varying in strength according to the movements of the transmitting-tracer, devices controlled thereby and connected to and controlling the movements of the receiving-pen, and means for producing vibrations in the current traversing the main-line circuit for vibrating such devices to reduce friction, said means including an induction-coil the secondary winding of which is connected in series with the main-line circuit, and the primary winding of which includes a suitable interrupter, substantially as described.

36. The combination with a receiving-pen, a local circuit controlling the movements of said pen to and from its writing-surface, a movable member controlling said circuit, a relay the armature of which is adapted to contact with said movable member to close said circuit and to vibrate relatively to said member so as to interrupt said circuit, and a circuit for said relay, substantially as described.

37. In a telautographic apparatus the combination with a receiving-pen, of a relay, a circuit including said relay, a vibrating armature for said relay, a second circuit controlling the movements of the receiving-pen to and from its writing-surface, a movable member controlling said last-named circuit and contacting with said armature so as to close said circuit during weak vibrations of said armature and which is out of effective contact therewith so as to interrupt said circuit during strong vibrations of said armature, substantially as described.

38. In a telautographic apparatus, the combination with a receiving-pen, of relay P, a circuit including said relay, vibrating armature $p$ for said relay, movable member $o^6$ adapted to contact with said armature, and a circuit controlled by said movable member and in turn controlling the movements of the receiving-pen to and from its writing-surface, substantially as described.

39. In a telautographic apparatus, the combination of a receiving-pen, an inking device therefor, and means for moving said receiving-pen into engagement with said inking device, said inking device comprising a suitable ink-receptacle containing absorbent material projecting from said receptacle and provided with an opening or recess for receiving said pen, substantially as described.

In testimony whereof I have hereunto set my hand in the presence of two subscribing witnesses.

GEORGE S. TIFFANY.

Witnesses:
T. F. KEHOE,
S. WINTHAL.